United States Patent [19]

Boyer

[11] Patent Number: 4,650,630

[45] Date of Patent: Mar. 17, 1987

[54] PROCESS AND APPARATUS FOR PRODUCING NUCLEAR FUSION ENERGY

[76] Inventor: John L. Boyer, 1506 E. Sycamore Ave., El Segundo, Calif. 90245

[21] Appl. No.: 681,706

[22] Filed: Dec. 13, 1984

Related U.S. Application Data

[63] Continuation of Ser. No. 348,027, Feb. 11, 1982, abandoned.

[51] Int. Cl.$^4$ .............................................. G21B 1/02
[52] U.S. Cl. .................................... 376/107; 376/146
[58] Field of Search ........ 376/107, 100, 146, 127–130, 376/105, 106; 250/251; 313/359.1, 360.1, 361.1, 362.1, 363.1

[56] References Cited

U.S. PATENT DOCUMENTS

| | | |
|---|---|---|
| 3,096,269 | 7/1963 | Halbach et al. . |
| 3,343,020 | 9/1967 | Gordon ........................... 376/107 |
| 3,424,905 | 1/1969 | Donnally ....................... 313/362.1 |
| 3,445,333 | 5/1969 | Lecomte .......................... 376/107 |
| 3,530,036 | 9/1970 | Hirsch ............................ 376/107 |
| 3,571,734 | 3/1971 | Consoli et al. . |
| 3,664,920 | 5/1972 | Hirsch ............................ 376/107 |
| 3,779,864 | 12/1973 | Kaw et al. . |
| 3,846,636 | 11/1974 | Zehr et al. ...................... 250/251 |
| 3,859,164 | 1/1975 | Nowak . |
| 3,935,503 | 1/1976 | Ress . |
| 4,172,008 | 10/1979 | Fleet . |
| 4,246,067 | 1/1981 | Linlor ............................ 376/129 |
| 4,390,494 | 6/1983 | Salisbury ...................... 313/363.1 |
| 4,395,631 | 7/1983 | Salisbury ........................ 376/130 |
| 4,397,809 | 8/1983 | Salisbury ........................ 376/107 |

FOREIGN PATENT DOCUMENTS

| | | | |
|---|---|---|---|
| 1243242 | 8/1960 | France | ................... 376/107 |
| 993174 | 5/1965 | United Kingdom . | |
| 1012751 | 12/1965 | United Kingdom | ............... 376/107 |

OTHER PUBLICATIONS

J. Appl. Phys., vol. 53, No. 7, 7/82, pp. 4597–4601, Baxter et al.
J. Appl. Phys., vol. 28, No. 11, 10/67, pp. 4522–4534, Hirsch.
Plasmas and Controlled Fusion, Rose et al., 1961, M.I.T. Press & John Wiley & Sons Inc., New York, London, pp. 406, 409, 436–439.
Booth et al., Laser-Driven Fusion Power, Proceedings of the I.E.E.E. Oct. 1975, pp. 1469–1471.

Primary Examiner—Harvey E. Behrend
Attorney, Agent, or Firm—Ostrolenk, Faber, Gerb & Soffen

[57] ABSTRACT

Two ion beams are accelerated on coincident paths in high vacuum with particle velocity vectors at 180° relative to one another to increase collison and fusion probabilities. The ion beams may be of the same or of different polarities and may both be the same isotope, or may be respectively of deuterium and tritium. A heat exchange fluid such as liquid lithium is in heat exchange contact with the vacuum chamber to remove energy generated by fusion reactions between colliding and fusing particles of the two beams. The velocity vectors of the beams are controlled over a narrow range in both magnitude and direction so that there is sufficient energy to encourage the fusion reaction but not so high as to cause the particles to have elastic collisions. The intersecting or coincident beams may move linearly toward one another or may move in identical circular paths having the identical geometry or paths which intersect at at least one point.

11 Claims, 7 Drawing Figures

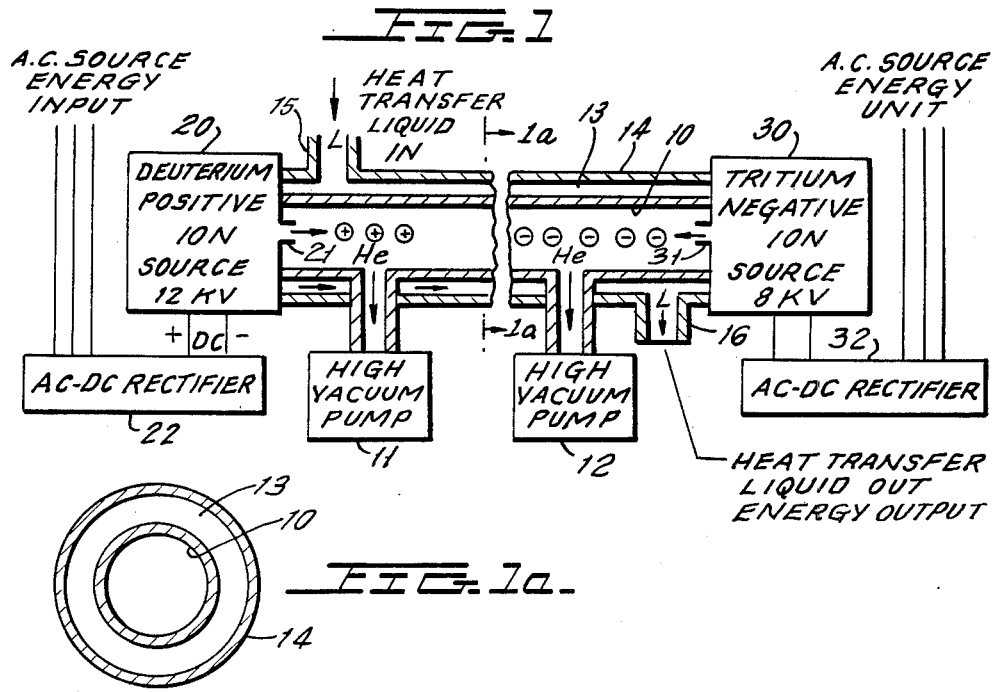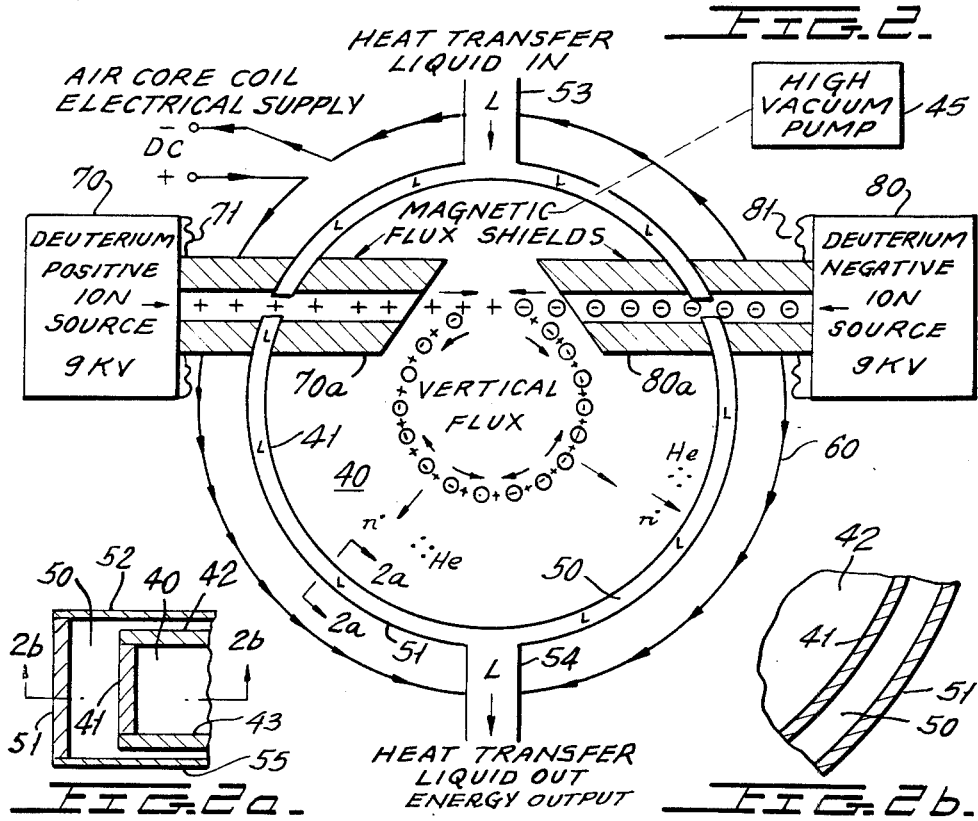

PROCESS AND APPARATUS FOR PRODUCING NUCLEAR FUSION ENERGY

This application is a continuation of application Ser. No. 348,027, filed Feb. 11, 1982, now abandoned.

BACKGROUND OF THE INVENTION

This invention relates to a process and apparatus for producing energy through the fusion of atomic nuclei and more particularly relates to a novel process and apparatus wherein the particles which are to enter into the fusion reaction are contained in counter-moving, relatively low energy beams in vacuum without a plasma.

The production of energy in a fusion reaction is well known although a successful self-maintaining process has not yet been carried out. The fusion reaction for the production of energy is desirable since it employs readily available fuels, particularly isotopes of hydrogen, and since fusion energy is safe and environmentally acceptable. The process is safe because very small amounts of particles, particularly deuterium and tritium, react at any instant so that a large uncontrolled release of energy is impossible. Moreover, fusion is inherently safe since the fusion process is quenched in response to any failure of the confinement system.

In order to obtain a self-sustained fusion reaction it is known that the so-called Lawson criterion must be satisfied. The Lawson criterion places inherent requirements on fusion systems such as the pulsed Tokamak system so that a power density in a plasma of deuterium and tritium must be about 18 kilowatts per cubic centimeter while a magnetic confinement field is required for the creation of the magnetic bottle which confines the plasma in a magnetic field of about 140 kilogauss. These requirements are extremely difficult to fulfill and explain the long delay in completion of, and high capital cost of Tokamak type equipment which will be capable of carrying out a self-sustained fusion process.

More specifically, some of the difficulties with successful operation of devices such as the Tokamak Fusion Test Reactor are as follows:

1. It is necessary to have a sufficient density of hydrogen isotopes such as deuterium or tritium to permit the fusion reaction. However, this density is difficult to maintain eletrically because it is difficult to obtain a sufficient voltage gradient in the plasma to effectively add energy and thus increase the temperature of either the positive ions or the electrons. All attempts to obtain an electrical gradient cause an electron current to flow but do not add very much energy to the positive ions which are the particles which must have high velocity in order to obtain the collisions needed to produce the fusion reaction.

2. Since the deuterium or tritium gas density should be relatively high, it is difficult to purge gas impurities from the plasma container. The existence of these impurities reduces the probability of fusion reaction between particles since they absorb energy from the isotope ions without contributing to the possibility of a fusion reaction. The impurity problem is well known and is complicated by the fact that the energy density in the plasma must be extremely high, causing the vaporization of many solids which are used in constructing the apparatus.

3. The positive ions of deuterium and tritium which are expected to combine are all positively charged and therefore repel each other in the plasma. Consequently, it is difficult to obtain a collision which causes a fusion reaction rather than an elastic collision. Several thousand collisions are required at the correct velocity vector direction and magnitude in order to cause a single fusion reaction. In the past, attempts to solve this problem were simply efforts which add to the density and energy of the plasma to cause more collisions even though the probability of a fusion reaction was extremely low because of the random velocity vector directions of the particles.

In order to add energy to the plasma, various heating methods are now being used in Tokamak machines. These include ohmic heating and neutral beam heating. Ohmic heating does not produce ion velocity vectors in the correct directions within the plasma to cause high energy collisions because when high fields are produced, the major velocity components are mostly in the same direction as that caused by the ohmic heating current flow. Consequently, ohmic heating of the gas encounters great difficulties of application. The use of neutral beam heating of the plasma and radio frequency heating are helpful but these require extremely large capital investment and complex equipment for the reactor.

BRIEF DESCRIPTION OF THE INVENTION

In accordance with the present invention, two ion beams preferably one of deuterium and one of tritium each having an appropriate relatively low energy are accelerated directly toward one another in vacuum. The beams can be moved linearly in an elongated vacuum chamber or can be rotated in counter-rotating directions relative to one another in circular paths. Preferably, but not necessarily, the two beams will be made up respectively of positive and negative ions, thus causing the intersecting ions to attract one another electrostatically and increasing the probability of a fusion collision. Energy which is produced by fusion of intersecting particles is removed as by a heat absorbing fluid which is circulated around the vacuum chamber. The heat absorbing fluid may be liquid lithium which can also serve as a source of tritium ions through conventional processing of the lithium. Note that ions other than deuterium and tritium can be used but deuterium and tritium are the preferred ions since they will undergo a fusion reaction at the lowest temperature known for various combinations of fusing particles.

The present invention avoids the problems identified above in connection with previous fusion machines since applicant's device need not satisfy the Lawson criteria. There is no plasma and the number of free electrons is held to a low level.

The production of energy in high vacuum in accordance with the invention is possible because of the relatively low energy density of the ions and the ability to employ fast vacuum pumping to remove neutral atoms and impurities, and also because of the absence of a need for a voltage gradient in the reaction chamber. The positive and negative hydrogen isotope ion beams are produced by well-known techniques. For example, the negative ion beam can be created by passing a positive ion beam through an alkali metal vapor such as sodium or cesium. A high percentage of the positive ions will then pick up two electrons and hold them long enough to be accelerated. The velocity vectors of the counter-moving beams may be controlled over a relatively narrow range in magnitude and direction so that there will be sufficient energy to cause the fusion reaction to occur but not so high that it will cause the fusing atoms to fly apart.

The employment of the novel invention causes a substantial increase in the probability of continuing fusion reactions at relatively low total energy levels for the ion densities used in the novel method and apparatus.

BRIEF DESCRIPTION OF THE DRAWINGS

FIG. 1 shows schematically a first embodiment of the invention in which two particle beams are linearly accelerated toward one another.

FIG. 1a is a cross-sectional view of FIG. 1 taken across the section line 1a—1a in FIG. 1.

FIG. 2 is a top view which schematically illlustrates a second embodiment of the invention wherein the counter-rotating ion beams rotate on a coincident diameter to provide an extremely long path for possible collisions within a cylindrical vacuum chamber.

FIG. 2a is a cross-section of FIG. 2 taken across the section line 2a—2a in FIG. 2.

FIG. 2b is a cross-section of FIG. 2a taken across the section line 2b—2b in FIG. 2A.

DETAILED DESCRIPTION OF THE DRAWINGS

Figure 3:
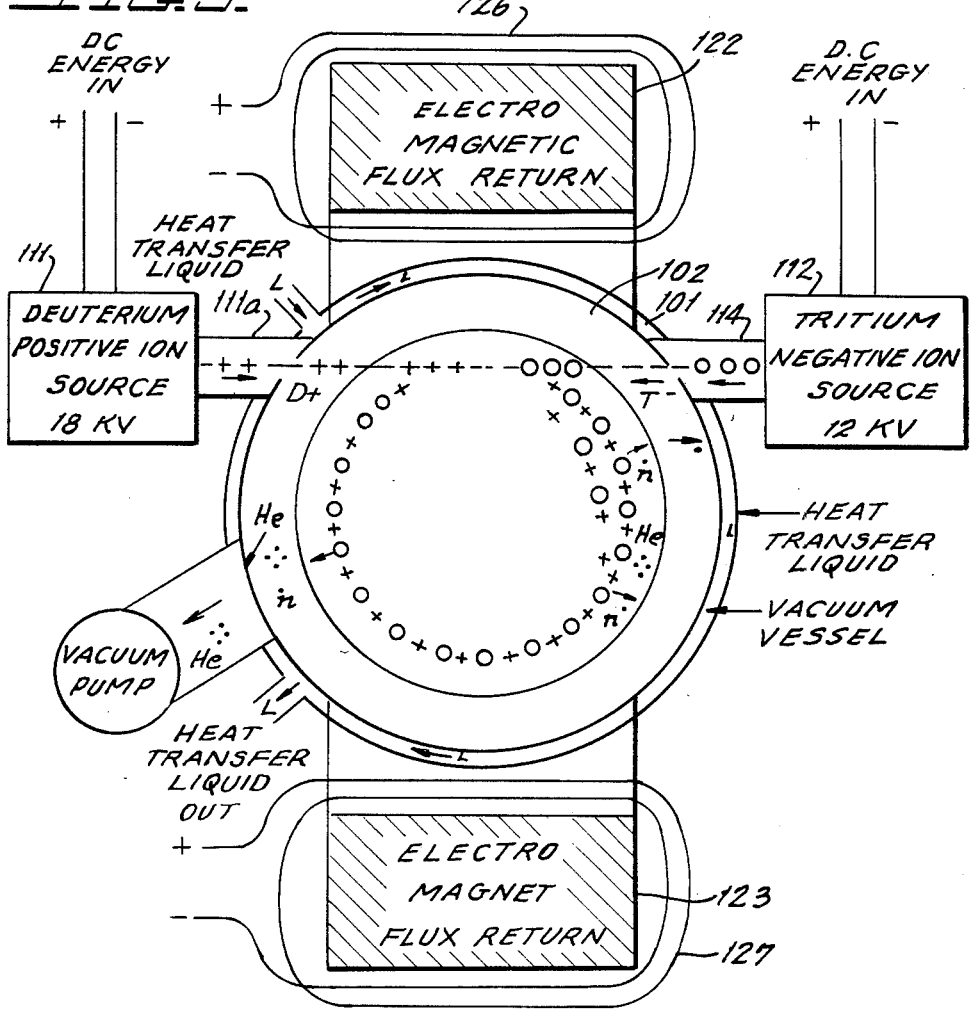
FIG. 3 is a top view partly in cross-section and illustrates an embodiment of the invention which employs counter-rotating beams of oppositely charged tritium and deuterium ions.

FIGS. 1 and 1a schematically show a first embodiment of the present invention in which two beams of ions are directed longitudinally toward one another. An elongated reaction tube 10 is provided which is a vacuum tube evacuated by high vacuum pumps 11 and 12 to a pressure less than about $1.7 \times 10^{12}$ atoms/cu cm or about $10^{-7}$ atmospheres. Tube 10 contains the fusion reaction and may have an inside diameter of 20 centimeters, a length of 120 centimeters and a wall thickness of 0.4 centimeter. The tube 10 may be made of ferro-magnetic 12% chromium steel material. The exterior of tube 10 may be covered with a layer of type 316 stainless steel material which can adequately withstand a fluid heat exchange medium which flows in the annular chamber 13 formed between the exterior of tube 10 and the interior of a coaxial tube 14. Tube 14 may be of type 316 stainless steel material and may have a wall thickness of 0.4 centimeter, and an inside diameter of 23.8 centimeters.

Suitable sealed openings are formed in the chamber 13 for receiving connections from vacuum pumps 11 and 12 and for receiving input and output connections 15 and 16 respectively for a heat transfer fluid. The heat transfer fluid may be liquid lithium or any other material. Lithium has the advantage of serving as a source of tritium for one of the ion beams to be described. The heat transfer liquid will be applied under pressure to conduit 15 and will flow along annular chamber 13 and will exit at conduit 16. During its traverse down the exterior of tube 10, the liquid will absorb heat from the interior of tube 10 produced by fusion reactions therein. The heated liquid lithium or other heat exchange fluid is then circulated to suitable conversion equipment for producing usable energy.

A source 20 of a positive deuterium ion beam is fixed to the left-hand end of concentric tubes 10 and 14 and has an ion outlet orifice 21 on the axis of tube 11. Source 20 accelerates a stream of positive ions along the axis of tube 10. The energy of the positive deuterium ions may be about 12 kV and the current of the ion beam may be about 500 milliamperes. A suitable power supply 21 energized from a suitable a.c. source powers the deuterium ion source. The construction of the deuterium positive ion source is well known and can be made by those skilled in the art without experimentation.

The right-hand end of concentric tubes 10 and 14 has fixed thereto a tritium negative ion source 30. Tritium source 30 has an outlet orifice 31 which produces a stream of tritium ions having an energy for example of 8 kV and a current of 500 milliamperes. The stream of tritium negative ions also flows along the axis of tube 10 opposite to the direction of ions from ion source 20. Note that magnetic flux shields can be applied to the tube 14 in order to prevent curvature of the beams of positive and negative ions so that the two oppositely directed beams of ions will tend to intersect one another over the full length of the tube 10. A suitable power source 32 energized from a conventional a.c. power source is provided to energize the tritium negative ion source 30.

The tritium negative ion source may be constructed employing the techniques described in any of the following publications:

AN INTENSE NEGATIVE HYDROGEN ION SOURCE FOR NEUTRAL INJECTION IN TOKAMAKS, K. Prelec and Th. Sluyters, Brookhaven Natonal Laboratory, Proc. of Sixth Symposium on Engineering Problems of Fusion Research, Nov. 18–21, 1975, page 430.

NEGATIVE HYDROGEN ION SOURCES FOR NEUTRAL BEAM INJECTORS, K. Prelec, Brookhaven National Laboratory, Seventh Symposium on Engineering Problems in Fusion Research, Oct. 25–28, 1977, page 303.

LARGE AREA NEGATIVE ION SOURCE FOR HIGH VOLTAGE NEUTRAL BEAMS, P. Poulsen and E. B. Hooper, Jr., Lawrence Livermore Laboratory, Proc. of the 8th Symposium on Engineering Problems of Fusion Research Nov. 13–16, 1979, page 676.

The apparatus described in FIG. 1 will produce two sharply focused counter-moving ion beams on the same path of about the same current and will to cause the maximum number of fusion collision reactions. Since the ions are of opposite polarity, they will electrostatically attract each other and will tend to collide and undergo a fusion reaction. The probability of fusion reaction will be relatively high and this in part determines the length of the vacuum tube for an optimum design such that the largest number of collision will be obtained.

As is well known, the reaction between the tritium ion and the deuterium ion, if they fuse, produces an alpha particle having an energy of about 3.5 Mev and a free neutron which will have an energy of approximately 14.1 Mev for a total energy release of about 17.6 Mev. The fusion process will continue because of the continuing supply of tritium and deuterium ions from the sources. The energy produced during fusion of those which fuse will be extracted from the apparatus in the liquid heat exchange fluid flowing from chamber 13.

The fusion reaction between tritium and deuterium ions can occur at about 10 Kev and the energy given off will be approximately 17 Mev to produce an energy multiplication factor of about 1,000. This energy multiplication factor will be greatly reduced due to various losses, but an energy multiplier factor of as small as 10 would easily justify the relatively low cost of the equipment of FIG. 1. The basic design can be made in various sizes to produce any desired power rating within ranges from a few kilowatts to many megawatts. The size of the equipment described for FIG. 1 will provide a thermal output rating of about 500 kw.

As pointed out previously, the tritium ions can be produced from the lithium which may be employed as the heat exchange fluid. Thus it is well known that tritium will be produced by bombarding the lithium with neutrons. An arrangement, not shown, can employ the neutrons released in the deuterium-tritium reaction to produce the tritium for the source 30.

In the embodiment of FIG. 1 the ion beams were described as a positive deuterium ion beam and a negative tritium ion beam. It should be noted that the polarities of the beams could be reversed. Moreover, while the ion beams are advantageously of different polarity, beams of the same ion polarities can be employed. It should be further expressly noted that the reaction and flow of the beams occurs in high vacuum so that the vacuum chamber 10 can be pumped to a very hard vacuum, thus removing contaminants, the waste helium and other ions which would tend to interfere with the flow of the ion beams and the production of fusion conditions.

FIGS. 2, 2a and 2b schematically illustrates a second embodiment of the invention wherein the ion beams of FIG. 1 travel on coincident, counter-rotating circular paths in a cylindrical vacuum chamber in a low magnetic field.

Referring to FIGS. 2, 2a and 2b, the vacuum chamber 40 is cylindrical in shape and is formed by a cylindrical wall 41 having generally flat upper and lower covers 42 and 43 sealed thereto. Chamber 40 is suitably evacuated as by the high vacuum pump 45. The vacuum chamber 40 can be formed of type 316 stainless steel material having a thickness for example of 0.8 centimeter and can have a diameter of 70 centimeters and a height of 20 centimeters. Note that chamber 40 could also be of toroidal configuration. A heat exchange conduit 50 is formed by an outer cylindrical wall 51 and flat plates 52 and 55 of stainless steel material having a wall thickness of 0.4 centimeter and radial extensions of the upper and lower walls 52 and 55. Suitable inlet and outlet conduits 53 and 54 respectively (FIG. 2) are provided in the wall 51.

A high current air coil, schematically illustrated as the coil 60, surrounds the exterior of the vacuum chamber 40 and produces a vertical magnetic flux through the chamber which may have a strength of 1600 gauss.

A deuterium positive ion source 70 is then fixed in place and is operable to inject a beam of positive deuterium ions as schematically illustrated into the interior of the chamber 40 with an energy of 9 kV. The ion beam from source 70, passes though a cylindrical magnetic flux shield 70a and is injected into the chamber 40 at the end of shield 70a. Obviously, this beam of positive ions will then rotate as shown, in a clockwise direction, due to the magnetic field of coil 60. Note that the positive ion source 70 may be connected to shield 70a by means of a bellows 71 which permits adjustment of the location of the injection of the deuterium positive ion beam into chamber 40 by moving source 70. The deuterium positive ion source may produce a current beam of 1100 milliamperes with the individual ions having an energy for example of 9 kV.

At the other side of the apparatus of FIG. 2, there is a deuterium negative ion source 80 which may have a structure identical to that of source 70 and is also fixed to a cylindrical magnetic flux shield 80a through an adjustment bellows 81. The negative ion source 80 may produce ions having an energy of about 9 kV and a beam current of 1100 milliamperes. The ion beams from sources 70 and 80 will rotate in opposite directions on coincident circular paths since they have the same energy. Therefore the negative ions and positive ions will have a high probability of interacting with one another in a fusion reaction since the ions have exactly opposite velocity vectors. Moreover, the ions of the counter-rotating beams are oppositely charged, thus tending to electrostatically attract one another when they approach one another.

The apparatus of FIG. 2 provides an extremely long path for the ions with a large number of possible collisions without requiring a long vacuum tube. The focusing and angle of entrance of the beams is adjustable within the ion sources 70 and 80 and through mechanical adjustment of the flux shields 70a and 80a through the bellows 71 and 81, respectively. Because of the multiple probabilities of collisions the ratio between the output power and input power is greater and the output of the equipment is expected to be about 2,000 kw.

A heat transfer liquid, which could be lithium, enters chamber 50 which surrounds the reaction chamber 40 and extracts therefrom energy produced by the reaction of the deuterium positive and negative ions.

As is well known, the reactions of the deuterium ions will be of two types. In the first, a helium isotope and a neutron are produced with a total energy release of 3.2 Mev. In the second reaction a tritium ion plus a proton will be produced with an energy release of 4.0 Mev.

Other hydrogen isotopes could be employed in the arrangement of FIG. 2. For example, the negative ion source 80 could be a tritium ion source with the voltage of the individual ions appropriately adjusted to ensure that their radius of curvature will coincide with that of the positive ions of source 70.

Figure 4:
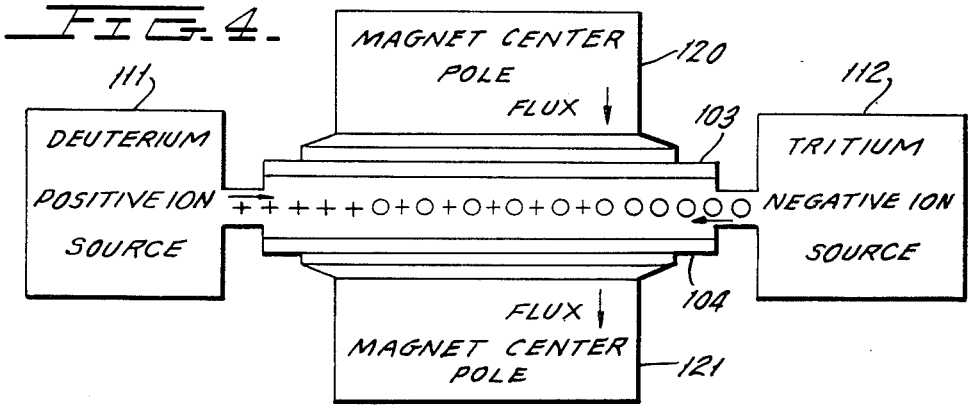
FIG. 4 is an elevation view of the apparatus of FIG. 3.

FIGS. 3 and 4 show a further embodiment of an apparatus which can be employed in accordance with the invention. More particularly, in FIGS. 3 and 4 there is provided a heat transfer annular region 101 which surrounds vacuum chamber 102 which is cylindrical. As shown in FIG. 4, the liquid heat exchange medium can also flow in flat channels 103 and 104 which are respectively above and below the vacuum chamber 102. A vacuum pump 110 is provided for providing a very high vacuum in the interior of chamber 102.

A positive deuterium ion source 111 is input to the vacuum chamber through the conduit 111a which includes suitable magnetic flux shields as in FIG. 2 so that a stream of positive deuterium ions with an energy of 18 kV is injected into the interior of the vacuum chamber 102. In a similar manner, a tritium negative ion source 112 is provided which injects a stream of negative tritium ions with an energy of 12 kV through shielded conduit 114 and into the interior of the vacuum chamber 102. Since the two sources have respectively different accelerating voltages inversely proportional to their particle masses, their counter-rotating beams, as schematically illustrated, will flow on identical coincident paths, thus ensuring the maximum number of interactions between the tritium and deuterium ions to lead to a large number of fusions. Note that the energy of the ion beams may be suitably adjusted or trimmed at sources 111 and 112 to obtain exact coincidence of the paths of their respective ion beams.

The magnetic flux necessary to cause the ion beams to travel in counter-rotating paths is derived from an electromagnet in FIGS. 3 and 4 as contrasted to the air coil of FIG. 2. Thus in FIG. 4 there is provided an electromagnetic system which will have center poles 120 and 121 which carry flux from outer flux return path members 122 and 123 shown in FIG. 3. Note that there is a continuous magnetic path from the yokes 122 and 123 to the magnetic center poles 120 and 121 respectively. The yokes 122 and 123 receive d.c. coils 125 and 126 respectively (FIG. 3) so that the electromagnetic system will produce a magnetic flux within the chamber 102 of 3000 gauss. The use of an iron flux path in FIGS. 3 and 4 makes it possible to more accurately control the ion beams thereby to produce a larger number of fusion reaction collisions.

In the arrangement of FIGS. 3 and 4, the voltage levels of the ion sources 111 and 112 are higher than may be necessary and are in the area of 300 million degrees K. Lower values for the ion energies may be employed.

The apparatus of FIGS. 1-4 do not depend on the Lawson criterion which is critical in a Tokamak type of fusion reactor. Consequently the energy density levels in the apparatus of the present invention can be low and impurities can be kept to a minimum since vacuum pumps can remove all atoms which do not have a controlled velocity direction. Moreover, in all embodiments, all energy is added to the various ions before they are injected into the vessel, thereby to minimize the creation of a plasma in the main vacuum vessel.

It is also possible to employ added focusing of the ion beams of FIGS. 1-4. For example, well-known alternate gradient focusing techniques could be used, whereby the beams will be synchronously focused and defocused in their paths. The beams will be adjusted to intersect at respective nodes where ions of both beams will be concentrated, having approximately 180° velocity vectors relative to one another.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

What is claimed is:

1. The process of producing a fusion reaction in a plasma-free environment comprising the steps of continuously pumping an evacuated vessel to a hard vacuum of the order of $10^{-7}$ atmospheres, producing a DC magnetic field, in said vessel; producing a first sharply focused homogeneous beam of positive hydrogen isotope ions of non-plasma form having a first energy and causing said first beam of ions to move along a given path in said evacuated vessel, producing a second sharply focused homogeneous beam of negative hydrogen isotope ions of non-plasma form having a second energy and causing said second beam of ions to move along a path coincident with but opposite in direction to said first path, said coincident path extending over a distance comprising a major portion of the total distance travelled by said first and second beams of ions; said first and second energies having values sufficient to produce a fusion reaction between said ions of said first and second beams which collide with one another but not so high to cause said colliding ions to fly apart, and heating a heat exchange fluid with at least a fraction of the energy produced by fusion of colliding ions and thereafter extracting useful energy from said heated heat exchange fluid.

2. The process of claim 1 wherein said path is a straight line.

3. The process of claim 1 wherein said path is curved.

4. The process of claim 1 wherein said path is circular.

5. The process of claim 1, 2, 3 or 4 wherein said ions of said first beam are deuterium and said ions of said second beam are tritium.

6. The process of claim 1 wherein said heat exchange fluid is liquid lithium.

7. Apparatus for producing energy from the fusion of ions of first and second sharply focused homogeneous ion beams is a plasma-free environment comprising:
   an evacuated chamber which has a hard vacuum therein of the order of $10^{-7}$ atmospheres and means for continuously drawing said hard vacuum in said chamber;
   means for producing a constant DC magnetic field in said vessel;
   first ion source means for producing said first ion beam to have a first energy, a first electrical charge and a non-plasma form and injecting said first ion beam into said chamber, said first ion beam moving along a given path within said chamber;
   second ion source means for producing said second ion beam to have a second energy, a second electrical charge of a polarity opposite to said first electrical charge and a non-plasma form and injecting said second ion beam into said chamber, said second ion beam moving along a path coincident with at least a major portion of the length of said given path within said chamber and directed oppositely to said first ion beam;
   the ions of said first and second ion beams having respective energies to maximize the probability of a fusion reaction between colliding ions of the respective beams in the absence of a plasma; and
   heat exchange means connected to said chamber to extract from said chamber energy which is produced by fusion reactions between the ions of said beams.

8. The apparatus of claim 7 wherein said path is a straight line.

9. The apparatus of claim 7 wherein said path is a curved line.

10. The apparatus of claim 7 wherein said path is a circle.

11. The apparatus of claim 7, 8, 9 or 10 wherein said ions of said first and second beams are of deuterium and tritium respectively.

* * * * *